US012052661B2

(12) United States Patent
Singh et al.

(10) Patent No.: US 12,052,661 B2
(45) Date of Patent: Jul. 30, 2024

(54) INTERCONNECTIVITY OF VOICE INTERFACE NETWORK DEVICES TO CONTROL ASPECTS OF A NETWORK ENVIRONMENT

(71) Applicant: ARRIS Enterprises LLC, Suwanee, GA (US)

(72) Inventors: Virendra Singh, Karnataka (IN); Vinod Jatti, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 398 days.

(21) Appl. No.: 17/477,885

(22) Filed: Sep. 17, 2021

(65) Prior Publication Data

US 2022/0124612 A1     Apr. 21, 2022

Related U.S. Application Data

(60) Provisional application No. 63/094,030, filed on Oct. 20, 2020.

(51) Int. Cl.
| | | |
|---|---|---|
| H04W 4/00 | (2018.01) | |
| H04W 4/02 | (2018.01) | |
| H04W 48/16 | (2009.01) | |
| H04W 48/20 | (2009.01) | |
| H04W 88/10 | (2009.01) | |

(52) U.S. Cl.
CPC ........... H04W 48/20 (2013.01); H04W 4/025 (2013.01); H04W 48/16 (2013.01); H04W 88/10 (2013.01)

(58) Field of Classification Search
CPC ...... H04W 48/16; H04W 48/20; H04W 4/025
USPC .......................................................... 370/329
See application file for complete search history.

(56) References Cited

U.S. PATENT DOCUMENTS

| | | | |
|---|---|---|---|
| 2014/0149060 A1* | 5/2014 | Meduna ................ | G06F 1/3206 |
| | | | 702/94 |
| 2016/0131358 A1* | 5/2016 | Spiro ..................... | H01F 41/041 |
| | | | 455/561 |
| 2018/0061411 A1* | 3/2018 | Bhat ..................... | H04R 25/558 |
| 2018/0158288 A1* | 6/2018 | Logan ................... | G08B 25/10 |
| 2019/0088098 A1* | 3/2019 | Gangumalla ......... | G01L 27/005 |
| 2020/0104433 A1* | 4/2020 | Santarone .............. | G06F 30/13 |

* cited by examiner

*Primary Examiner* — Temica M Beamer
(74) *Attorney, Agent, or Firm* — Wenderoth, Lind & Ponack, L.L.P.

(57) ABSTRACT

A user environment can be enhanced by the interconnection of multiple network devices. A principal network device can connect to one or more auxiliary network devices. Based on one or more profile parameters, the principal network device can alter, change or modify an aspect or operation of one or more client devices in the user environment. The principal and auxiliary network devices can monitor, detect or sense environment parameters associated with a user or a location within the user environment so as to control one or more aspects or operation of the one or more client devices. The user environment can be controlled for any number of users and any number of client devices. Automatically or dynamically controlling the user environment based on profile parameters can enhance the experience of the user no matter where the user is within the user environment.

20 Claims, 4 Drawing Sheets

INTERCONNECTIVITY OF VOICE INTERFACE NETWORK DEVICES TO CONTROL ASPECTS OF A NETWORK ENVIRONMENT

BACKGROUND

Companies are increasingly providing Multiple Access Point (MAP) architecture or Home Network Controller (HNC) type of home wireless fidelity (Wi-Fi) management, with multiple access point devices and/or extender access point devices within the home to improve Quality of Experience (QoE) of the user of various client devices by offering extended coverage with seamless roaming in a network environment. Access point devices and extender access point devices can communicate with client devices using one or more RF channels.

Generally, a user of a network environment can utilize a variety of client devices including client devices that have a small form-factor, are located throughout the network environment, connected to multiple network devices, have different capabilities or functions, etc. Users are increasingly demanding that all devices in a network environment operate and/or communicate seamlessly with each other to foster a cohesive and consistent network environment experience no matter the location of the user or any client device associated with the user. However, with client devices becoming smaller, portable and/or providing greater functionality, these client devices can become lost or difficult to find or even interfere with activities of the user as, generally, the client devices do not communicate with each other or other network devices and are not aware of which users, if any, are in proximity of the client devices. Users can become dissatisfied with the network environment experience. Thus, there is a need to provide an interconnection between the network devices associated with the various client devices in a network environment to provide a better quality of experience (QoE) for a user.

SUMMARY

According to aspects of the present disclosure there are provided novel solutions for interconnecting a plurality of network devices that are also each connected, at one time or another, to one or more client devices. A principal network device intuitively combines or interconnects the auxiliary network devices in a network environment, for example, a set-top box, a smart speaker, a smart assistant, an Internet of things (IoT) hub, a remote control, or any other network device. The principal network device allows a service provider to deliver compelling, personalized and aggregated services in entertainment, home control, e-health, education, utilities, productivity, and/or various other functionalities.

With evolving technology, device manufacturers are providing cost effective voice interface as an add-on feature to many network devices that are distributed or used throughout a network environment. As each of these network devices become more essential to the user's network environment experience and more pervasive throughout the user's site or premises, users are becoming daunted by the task of not only locating client devices but also with controlling the client devices so as to provide a QoE network environment. A principal network device is a novel solution that interconnects the various auxiliary network devices so as to coordinate, manage or control one or more aspects of the network environment and the interaction of the user with the various auxiliary network devices, the principal network device, and/or any one or more of the multiple client devices. Interconnectivity of the various auxiliary network devices can be established by making use of existing network (wired or wireless) protocols. For example, voice interface network devices comprise a voice user interface as a front end and a wired/wireless network protocol as a backend. Using backend network protocol, these voice interface network devices can form a multicast group and mutually coordinate amongst each other. Such coordination can improve the range of these voice interface network devices and achieve broader coverage of service so as to allow users to roam seamlessly within a network environment.

An aspect of the present disclosure provides a principal network device for interconnecting with one or more auxiliary network devices. The principal network device includes a memory storing one or more computer-readable instructions and a processor coupled to a sensing device that is configured to execute the one or more computer-readable instructions to identify the one or more auxiliary network devices, interconnect with the one or more auxiliary network devices by establishing a connection with the one or more auxiliary network devices, receive a sensed environmental parameter from at least one of the one or more auxiliary network devices, the sensing device, or both, determine a network device to receive an instruction associated with the sensed environmental parameter based on a profile parameter, wherein the network device is any of the principal network device, the at least one of the one or more auxiliary network devices, or a combination thereof, and send the instruction to the network device.

In an aspect of the present disclosure, the processor is further configured to execute the one or more computer-readable instructions to determine a user associated with the sensed environmental parameter, determine a location of the user, and wherein determining the network device is based on the location of the user.

In an aspect of the present disclosure, the sensed environmental parameter is associated with a client device within proximity of the at least one of the one or more auxiliary network devices.

In an aspect of the present disclosure, the instruction comprises a notification to the user, and wherein the notification comprises information associated with the client device.

In an aspect of the present disclosure, the instruction comprises a command for the network device to establish a two-way communication with a first auxiliary network device of the one or more auxiliary network devices.

In an aspect of the present disclosure, the processor is further configured to execute the one or more computer-readable instructions to determine a setting associated with the profile parameter.

In an aspect of the present disclosure, the instruction comprises a command to alter an operation of one or more client devices within proximity of the network device based on the setting.

An aspect of the present disclosure provides a method for a principal network device to interconnect with one or more auxiliary network devices. The method comprises identifying the one or more auxiliary network devices interconnecting with the one or more auxiliary network devices by establishing a connection with the one or more auxiliary network devices, receiving a sensed environmental parameter from at least one of the one or more auxiliary network devices, a sensing device coupled to a processor of the principal network device, or both, determining a network device to receive an instruction associated with the sensed environmental parameter based on a profile parameter, wherein the network device is any of the principal network device, at least one of the one or more auxiliary network devices, or a combination thereof, and sending the instruction to the network device.

In an aspect of the present disclosure, the method further comprises determining a user associated with the sensed environmental parameter, determining a location of the user, and wherein determining the network device is based on the location of the user.

In an aspect of the present disclosure, the method such that the sensed environmental parameter is associated with a client device within proximity of the at least one of the one or more auxiliary network devices.

In an aspect of the present disclosure, the method such that the instruction comprises a notification to the user, and wherein the notification comprises information associated with the client device.

In an aspect of the present disclosure, the method such that the instruction comprises a command for the network device to establish a two-way communication with a first auxiliary network device of the one or more auxiliary network devices.

In an aspect of the present disclosure, the method further comprising determining a setting associated with the sensed environmental parameter.

In an aspect of the present disclosure, the method such that the instruction comprises a command to alter an operation of one or more client devices within proximity of the network device based on the setting.

An aspect of the present disclosure provides a non-transitory computer-readable medium of a principal network device storing one or more instructions for interconnecting with one or more auxiliary network devices. The one or more instructions when executed by a processor of the principal network device, causes the principal network device to perform one or more operations including the steps of the methods described above.

Thus, according to various aspects of the present disclosure described herein, it is possible to provide a principal network devices that interconnects with one or more auxiliary network devices to coordinate, control and/or manage one or more client devices associated with one or more users. The network environment can be customized and the QoE of the one or more users enhanced by the interconnectivity of the principal network devices and the one or more auxiliary network devices that are associated with one or more client devices.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
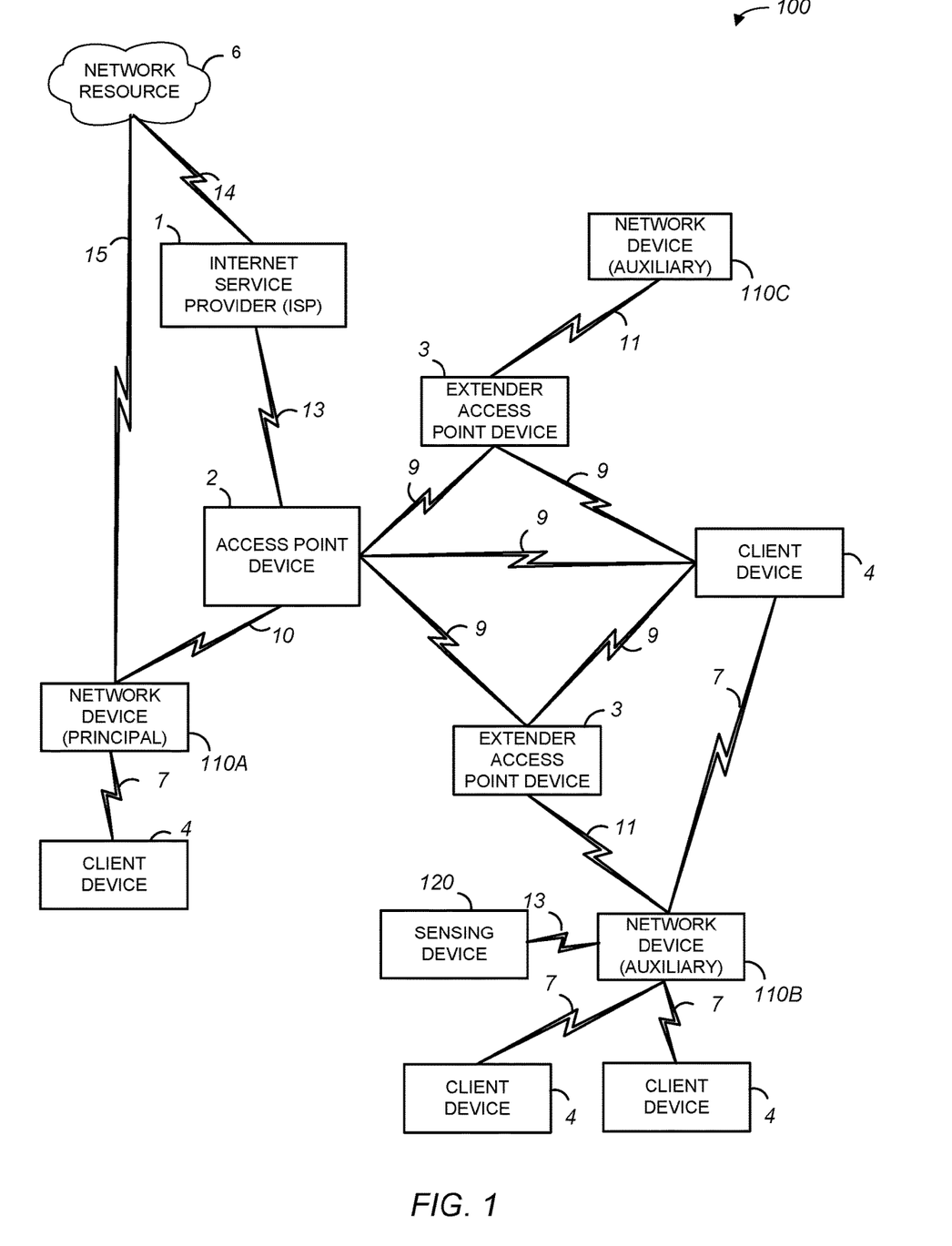
FIG. 1 is a schematic diagram of a network environment, according to one or more aspects of the present disclosure.

FIG. 1 is a schematic diagram of a network environment 100, according to one or more aspects of the present disclosure.

It should be appreciated that various example embodiments of inventive concepts disclosed herein are not limited to specific numbers or combinations of devices, and there may be one or multiple of some of the aforementioned electronic apparatuses or network devices in the network environment 100, which may itself consist of multiple communication networks and various known or future developed wireless connectivity technologies, protocols, devices, and the like.

A network environment 100 can be implemented for various types of networks including, for example, a home network where multiple users interact with or utilize multiple client devices. While FIG. 1 illustrates an exemplary configuration of a network environment, the present disclosure contemplates any other one or more connections and one or more electronic devices, for example, the electronic devices illustrated in FIG. 1.

As shown in FIG. 1, the main elements of the network environment 100 include an access point device 2 connected to the network resource 6 via an Internet Service Provider (ISP) 1, one or more network devices 110A, 110B, 110C (collectively referred to as network device(s) 110) connected to the access point device 2 via one or more extender access point devices 3, and one or more client devices 4 connected to one or more network devices 110, one or more extender access point devices 3, and/or access point device 2. The network environment 100 shown in FIG. 1 can include one or more wireless electronic devices (e.g., extender access point devices 3, one or more network devices 110 and client devices 4) that may be connected in one or more wireless networks (e.g., private, guest, iControl, backhaul network, or Internet of things (IoT) network) within the network environment 100. Additionally, there could be some overlap between wireless electronic devices (e.g., extender access point devices 3, network devices 110, and client devices 4) in the different networks. That is, one or more wireless electronic devices could be located in more than one network. For example, the extender access point devices 3 could be located both in a private network for providing content and information to any of the one or more client devices 4 and/or network devices 110 and also included in a backhaul network or an iControl network. In one or more embodiments, any one or more electronic devices can be wired network devices.

Starting from the top of FIG. 1, the ISP 1 can be any computer for connecting the access point device 2 to a network resource 6. The network resource 6 can send or transmit information or data to the ISP 1, for example, content associated with any one or more uniform resource locators (URL(s)), data associated with a particular electronic device, data associated with a particular user or group of users, any other requested information, or a combination thereof. For example, network resource 6 can include any of a server, a software and/or application, a URL, an application program interface (API), a repository (such as a database or any other storage system) or any combination thereof. The connection 14 between the network resource 6 and the ISP 1 and the connection 13 between the ISP 1 and the access point device 2 can be implemented using a wide area network (WAN), a virtual private network (VPN), a metropolitan area networks (MAN), a system area networks (SAN), a data over cable service interface specification (DOCSIS) network, a fiber optics network (e.g., FTTH (fiber to the home) or FTTX (fiber to the x), or a hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example The access point device 2 can be, for example, an access point and/or a hardware electronic device that may be a combination modem and gateway, such as a residential gateway, that combines the functions of a modem, an access point (AP), and/or a router for providing content received from the ISP 1 to one or more electronic devices (e.g., wireless extender access point devices 3, network devices 110, and client devices 4) in the network environment 100. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP). Further, an access point device 2 can, in one or more embodiments, comprise a network device 110 and perform any of the functionality described herein with respect to, for example, network devices 110A, 110B, and/or 110C.

The connection 9 between the access point device 2, the wireless extender access point devices 3, and client devices 4 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information associated with an asset, for example, content received from and/or communicated to ISP 1.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, network devices 110 and/or client devices 4, which may be out of range of the access point device 2. The extender access point devices 3 can also receive signals from the network devices 110 and/or client devices 4 and rebroadcast the signals to the access point device 2, or other network devices 110 and/or client devices 4. While FIG. 1 illustrates a direct connection between extender access point devices 3 and the access point device 2, the present disclosure contemplates an indirect connection as well, for example, via an additional extender access point device 3.

The connections 11 between the extender access point devices 3 and the network devices 110 are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers including, but not limited to, any of a desktop computer or a laptop, an electronic tablet, a mobile phone, a smart phone, a smart speaker, an IoT device, an iControl device, a portable music player with smart capabilities capable of connecting to the Internet, a cellular network, and/or interconnecting with other electronic devices via Wi-Fi and/or Bluetooth, other wireless hand-held consumer electronic devices, such as via connection 7 to a network device 110. Additionally, the client devices 4 can be a television (TV), an IP/QAM set-top box (STB) or a streaming media decoder that is capable of decoding audio/video content, and playing over OTT or MSO provided content received through the access point device 2.

Figure 2A:
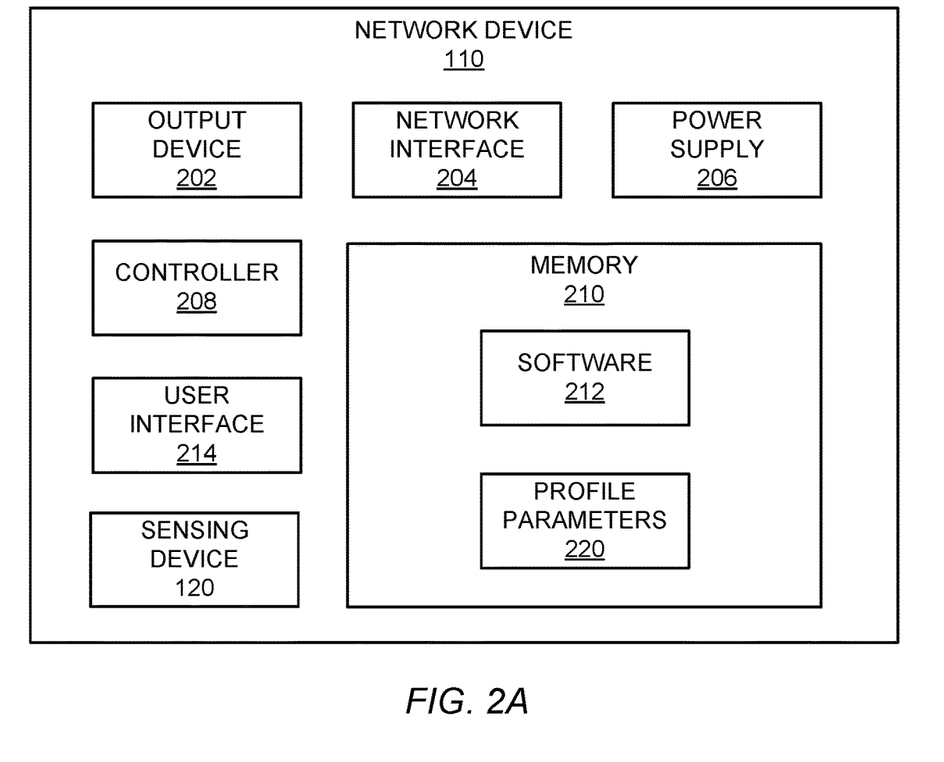
FIGS. 2A and 2B are a more detailed block diagram illustrating various components of a network device implemented in the network environment of FIG. 1, according to one or more aspects of the present disclosure.

Network device 110 can connect to a client device 4 via a connection 7. Connection 7 can utilize any one or more protocols discussed above with respect to connection 9. In one or more embodiments, a network device 110 can sense or otherwise identify, acknowledge and/or receive a sensed environmental parameter associated with the client device 4. A sensed environmental parameter can include, but is not limited to, any of a sound (for example, a tone, any collection or combination of sounds whether audible or inaudible, a voice, any other sound, or any combination thereof), a vibration, a movement, a user, any environmental condition (such as a temperature, a humidity, a barometric pressure, a light level, any other condition, or a combination thereof), any other parameter that can be sensed or detected, or any combination thereof. In one or more embodiments, the network device 110 can comprise a sensing device 120 (as illustrated in FIG. 2A) and/or be coupled to a sensing device 120 via a connection 13. Connection 13 can be the same as or similar to the connection 7.

The connection 10 between the access point device 2 and the client device 4 can be implemented through a wireless connection that operates in accordance with, but is not limited to, any IEEE 802.11 protocols, for example, a connection that utilizes one or more channels. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connections 10 can also be a wired Ethernet connection.

The connection 15 between the network device 110A and the network resource 6 can be any type of connection discussed herein. For example, the network resource 6 can be the same provider of the network device 110A and a backend connection 15 can be established between the network resource 6 and the network device 110A.

In general, it is contemplated by the present disclosure that the access point device 2, the extender access point devices 3, the network devices 110, the client devices 4, and the sensing device 120 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, the network devices 110, the client devices 4, and the sensing device 120 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, the network devices 110, the client devices 4, and the sensing device 120 are further equipped with components to facilitate communication with other computing and/or network devices over the one or more network connections to local and wide area networks, wireless and wired networks, public and private networks, and any other communication network enabling communication in the network environment 100.

Figure 2B:
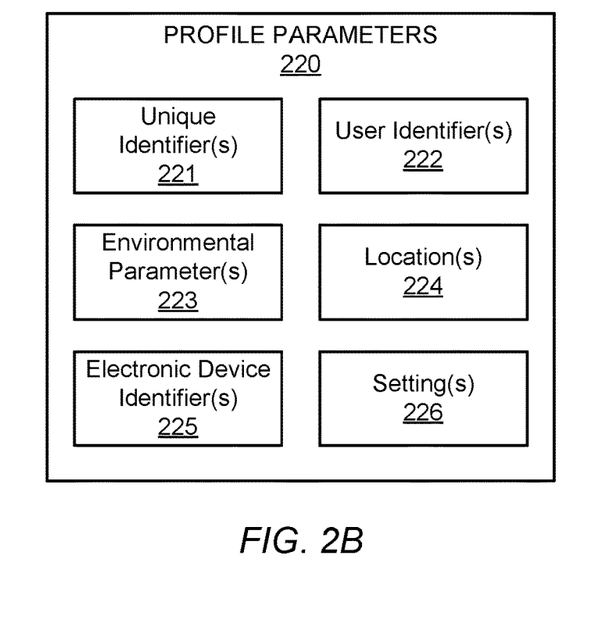

FIGS. 2A and 2B are a more detailed block diagram illustrating various components of an exemplary network device 110, implemented in the network environment 100 of FIG. 1, according to one or more embodiments. The network device 110 includes an output device 202, a network interface 204, a power supply 206, a controller 208, a memory 210, a user interface 214, and a sensing device 120.

The power supply 206 supplies power to any one or more of the internal components of the network device 110, for example, through an internal bus. The power supply 206 can be a self-contained power source such as a battery pack with an interface to be powered through an electrical charger connected to an outlet (e.g., either directly or by way of another device). The power supply 206 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The network interface 204 can include, but is not limited to, various network cards, interfaces, and circuitry implemented in software and/or hardware to enable communications with the network device 110 using any of the communication protocol(s) discussed with reference to FIG. 1. For example, the network interface 204 allows for communication between the network device 110 and one or more client devices 4, one or more external sensing devices 120, and/or one or more network resources 6. In one or more embodiments, the network interface 204 can provide indirect access to network resource 6 as illustrated in FIG. 1 or an indirect access to network resource 6 via a backchannel connection.

Output device 202 provides audio output, visual output, multi-media output, or any combination thereof for example, to a user or any one or more other electronic devices within a proximity of the network device 110. Output device 202 can comprise any of a speaker, a sound bar, an indicator (such as any visual indicator, for example, an light emitting diode), a display (such as a television, a monitor, a projector, and/or any other audio playback device, video playback device, or both), any other device that is capable of providing multi-media content for consumption by a user or electronic device, or any combination thereof. For example, output device 202 can output an audible notification.

Sensing device 120 detects or senses one or more sensed environmental parameters 223 as discussed with reference to FIG. 2B. The sensing device 120 can be any type of sensing system or device including, but not limited to, any of a temperature sensor, a motion sensor, a voice user interface (for example, any of an audible response system, a voice and/or speech recognition system, a voice command device, or any combination thereof), a temperature sensor, a humidity sensor, a light sensor, a luminescence sensor, a barometric pressure sensor, a vibration sensor, an audio input or sound sensor (such as a microphone), any other system for sensing or detecting a sensed environmental parameter, or any combination thereof. The sensing device 120 can be included as part of or internal to the network device 110 (as shown) or remote from or coupled to the network device 110 (as illustrated in FIG. 1). Any data collected or received from a sensing device 120 can be stored in memory 210, communicated to one or more other network devices 110, or both. In one or more embodiments, a sensing device 120 can voluntarily or automatically prompt (or provoke) a user input. For example, a notification can be delivered to a user without the location of the user within the network environment being known by initiating a sound (such as a tone) at an output device 202 of one or more auxiliary network devices 110. The user can respond to the notification using a voice command that is received at a sensing device 120 at an auxiliary network device 110 within proximity of the user, for example, at a voice user interface of the auxiliary network device 110 that requests the information associated with the notification. Upon receipt of the voice command, the auxiliary network device 110 can provide or deliver the notification to the user via the output device 202 (for example, a speaker).

The user interface 214 includes, but is not limited to, any of one or more tactile inputs (for example, a push button, a selector, a dial, etc.), a camera, a keyboard, an audio input, for example, a microphone, a keypad, a liquid crystal display (LCD), a thin film transistor (TFT), a light-emitting diode (LED), a high definition (HD) or other similar display device including a display device having touch screen capabilities so as to allow interaction between one or more users and the network device 110, the network device 110 and one or more client devices 4 and/or one or more other network devices 110, or a combination thereof. For example, the user interface 214 can provide an interface associated with the configuration of one or more profile parameters 220.

The memory 210 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical drive, a hard disk or any other various layers of memory hierarchy. The memory 210 can be used to store any type of instructions, program, software, or algorithms including software 212 for interconnecting one or more electronic devices, such as the principal network device 110A with one or more network devices 110, client devices 4, sensing devices 120, or any combination thereof. In one or more embodiments, software 212 includes one or more applications and/or instructions for receiving one or more profile parameters 220 that are stored in memory 210 and utilizing the one or more profile parameters 220 to control one or more electronic devices (such as one or more network devices 110, one or more client devices 4, one or more sensing devices 120, any other electronic devices, or a combination thereof so as to provide an enhanced user experience within the network environment 100.

As shown in FIG. 2B, the one or more profile parameters 220 can comprise one or more unique identifiers 221, one or more environmental parameters 223, one or more electronic device identifiers 225, one or more user identifiers 222, one or more locations 224, one or more settings 226, any other one or more parameters, or a combination thereof. The one or more unique identifiers 221 provide a unique value associated with a particular profile parameter 220. For example, the unique identifier 221 can be a username, an IP address, a randomly generated value, any other unique value, or a combination thereof. The unique identifier 221 can be associated with any of the environmental parameters 223, the electronic device identifiers 225, the user identifiers 222, the locations 224, and/or the settings 226. For example, a sensed environmental parameter can be compared to or associated with an environmental parameter 223.

The one or more user identifiers 222 can include one or more parameters that identify a particular user or group of users. For example, a user identifier 222 can comprise an audio, a video, a picture, and/or any other unique identifier of a particular user. The user identifier 222 can be utilized by the software 212 to identify a user in the network environment 100 so as to conform the network environment according to the one or more other profile parameters 220 associated with the user identifier 222.

The one or more environmental parameters 223 can include, but are not limited to, any of a sound (for example, a tone, any collection or combination of sounds whether audible or inaudible, a voice, any other sound, or any combination thereof), a biometric parameter, a vibration, a movement, a user, any environment condition (such as a temperature, a humidity, a barometric pressure, a light level, any other condition, or a combination thereof), any other parameter that can be sensed or detected, or any combination thereof. The one or more environmental parameters 223 can be compared one or more sensed environmental parameters from a sensing device 120, for example, One or more environmental parameters 223 can be associated with a user identifier 222. The software 212 can alter, modify or otherwise control one or more aspects or operations of one or more electronic devices in a network environment 100 based on the one or more environmental parameters 223 associated with the user identifier 222. The one or more aspects or operations can comprise any of a volume, a display, a brightness, a sound, a connection to one or more other electronic devices, any other aspect or operation, or any combination thereof.

Each profile parameter 220 can be associated with a location 224. The location 224 can correspond to a physical position within a network environment 100. For example, if a user is identified based on the user identifier 222 and that user identifier 222 is associated with a location 224, then if the user is determined to be present at or within proximity of the location 224, then the software 212 can alter, modify or otherwise control one or more aspects or operations of the network environment 100 at the location 224.

The one or more electronic device identifiers 225 can uniquely identify any of the one or more electronic devices of the network environment 100. One or more settings 226 and can be associated with the electronic device identifier 225. For example, a first electronic identifier 225 can be associated with a client device 4, such as a television. The first setting 226 can be indicative of a volume level for the television. Any one or more environmental parameters 223 can be associated with an electronic device identifier 225. For example, the software 212 can identify a first user based on a first user identifier 222, for example, based on voice recognition. The first user identifier 222 can be associated with a first environmental parameter 223 (a sound level) that is associated with a first electronic device identifier 225 (a client device 4, such as a television). If the software 212 determines that the first user is at a first location 224 and that the sound level of the television is at, above, and/or below a threshold, the software 212 can alter the volume level of the television based on the volume level indicated by the first setting 226. For example, a user can set one or more profile parameters 220 to increase the volume level of a television when the user is identified to be at a specific location within the network environment.

The controller 208 controls the general operations of the network device 110 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 212 for altering, modifying or otherwise controlling one or more electronic devices in a network environment in accordance with the embodiments described in the present disclosure. Communication between any of the components (e.g., 202, 204, 206, 210, 212, 214, 220, and 120) of the network device 110 can be established using an internal bus.

In one or more embodiments, one or more network devices 110A can be coupled directly or indirectly to one or more network devices 110B and 110C. In one or more embodiments, the network device 110 can query a network resource 6 for any one or more profile parameters 220 and receive one or more profile parameters 220 from the network resource 6.

Figure 3:
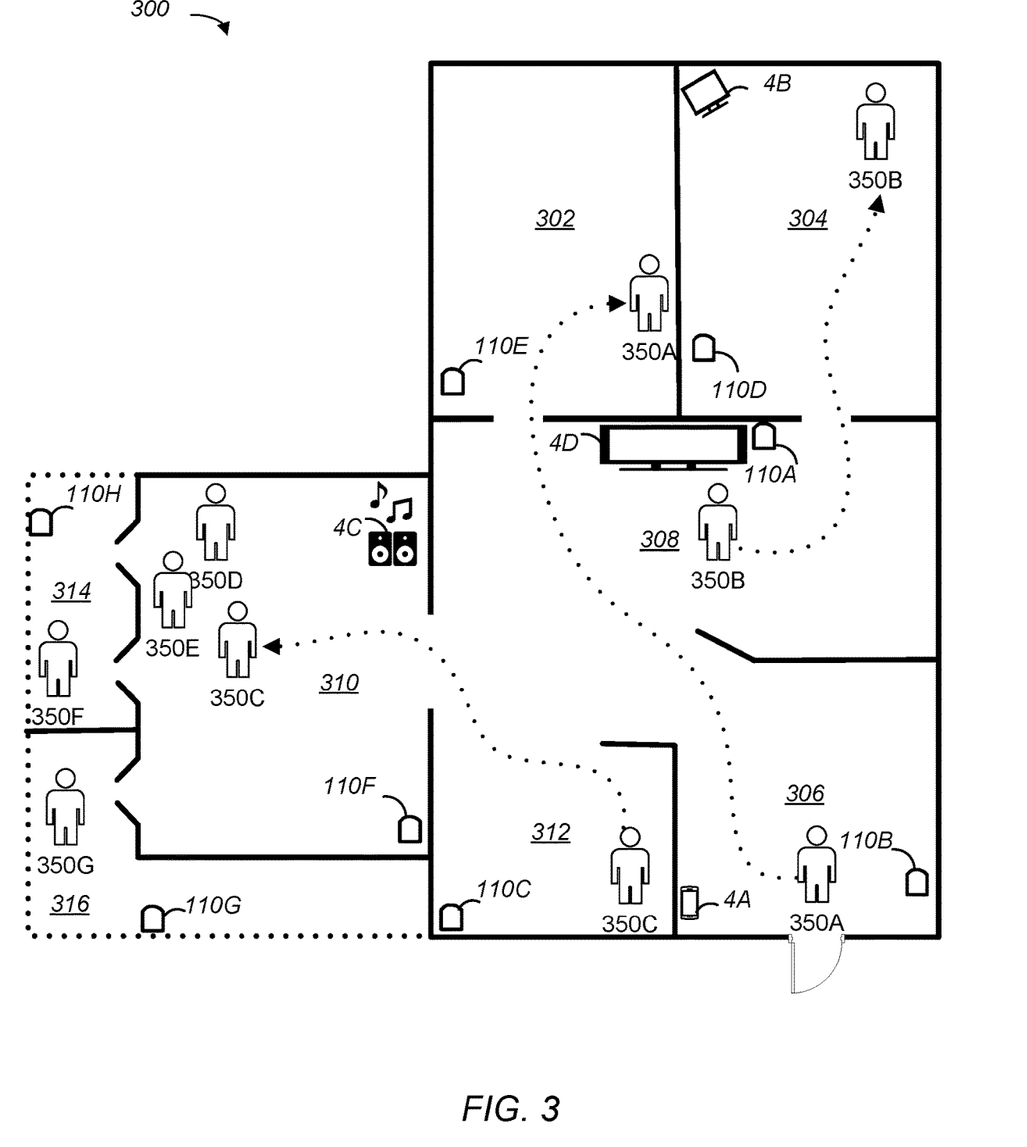
FIG. 3 illustrates a block diagram of a configuration of electronic devices in a user environment, according to one or more aspects of the present disclosure.

FIG. 3 illustrates a block diagram of a configuration of electronic devices in a user environment 300, according to one or embodiments of the present disclosure. User environment 300 can include a network environment, for example network environment 100, such that user environment 300 includes a wireless network with one or more electronic devices connected to the wireless network, such as one or more client devices (such as, client device 4A (for example, a mobile phone 4A), client device 4B (for example, a first television 4B), a client device 4C (for example, a multi-media player 4C), a client device 4D (for example, a second television 4D)), and/or one or more network devices (such as a first, second, third, fourth, fifth, sixth, and seventh auxiliary network devices, respectively referred to as auxiliary network devices 110B, 110C, 110D, 110E, 110F, 110G, and 110H, and/or a principal network device 110A). User environment 300 can include one or more rooms or locations, for example, any of a first user location 302 (for example, a first bedroom 302), a second user location 304 (for example, a second bedroom 304), a third user location 306 (for example, a foyer 306), a fourth user location 308 (for example, a living room 308), a fifth user location 310 (for example, a media room 310), a sixth user location 312 (for example, a kitchen 312), a seventh user location 314 (for example, a patio 314), an eighth user location 316 (for example, a sun room 316), any other user location, or any combination thereof. The principal network device 110A can include a program 212 for interconnecting with any one or more electronic devices in the network environment 300, for example, interconnecting with the one or more auxiliary network devices 110B-110H. The interconnecting can provide a connection between these electronic devices such that each can receive and send any sensed environmental parameter received or detected to any one or more other electronic devices.

Any one or more users 350 (for example, Users 350A, 350B, 350C, 350D, 350E, 350F and/or 350G) can traverse from one user location to another user location throughout the user environment 300 as indicated by the dotted lines in FIG. 3. For example, a User 350A can enter user environment 300 at the foyer 306. User 350A can be associated with a client device 4A, for example, a mobile phone 4A. User 350A can traverse the user environment 300 from the foyer 306 to a first bedroom 302. The auxiliary network device 110B can detect or identify that the mobile phone 4A is at or about the foyer 306, such as within a proximity of the auxiliary network device 110B. If the mobile phone 4A receives a call, message, notification, etc., the auxiliary network device 110B can send a notification to the principal network device 110A. Principal network device 110A can determine that mobile phone 4A is associated with User 350A based, for example, on one or more profile parameters 220. The principal network device 110 can include a program or software 212 that provides for one or more operations. For example, the principal network device 110A can poll the one or more auxiliary network devices 110C-G to determine if User 350A is within a proximity of the one or more auxiliary network devices 110C-G. The auxiliary network device 110E can detect User 350A at the first bedroom 302 by sensing one or more sensed environmental parameters. For example, the auxiliary network device 110E can detect or sense an audio input associated with User 350A, such as by using a voice recognition sensing device of or coupled to the auxiliary network device 110E. The auxiliary network device 110E can compare the audio input or voice data from the voice recognition sensing device to one or more profile parameters, such as one or more user identifiers 222 and then sending the location of the User 350A to the principal network device 110A as a response to a poll, as part of a periodic update, as part of an unsolicited response, as part of any other type of response or query, or any combination thereof. As another example, the auxiliary network device 110E can send the audio input or voice data to the principal network device 110A and the principal network device 110A can determine the location of the User 350A. Once principal network device 110A determines or receives the location of User 350A, the principal network device 110A can send a notification to the auxiliary network device 110E associated with the new location of User 350A that notifies User 350A of activity on the mobile phone 4A. For example, the notification can comprise a sound, such as a tone or a sound currently emanating from the mobile phone 4A, an audible message, a visual message, any other type of notification, or any combination thereof. The notification can be based on one or more identified capabilities of the auxiliary network device 110E. For example, during an onboarding, initialization, query, poll, any other identification process, or any combination thereof of the one or more network devices 110 in the user environment 300, the principal network device 110A can identify the one or more capabilities associated with any one or more of the network devices 110.

In one or more embodiments, a User 350C is identified or detected in the kitchen 312 by auxiliary network device 110C. User 350C can traverse the user environment 300 away from auxiliary device 110C and to within proximity of the auxiliary device 110F so as to join User 350D and User 350E in the media room 310. The auxiliary device 110C can detect, for example, via a motion sensor or detector, that User 350C has traversed outside the proximity of the auxiliary device 110C and/or the kitchen 312. In one or more embodiments, the auxiliary device 110 C can broadcast this change in location of User 350C to one or more other network devices 110, for example, so that the one or more other network devices can initiate a sensing or detection for User 350C. When User 350C comes within proximity of auxiliary network device 110F, auxiliary network device 110F can determine that User 350C is associated with a profile parameter 220 where an associated location 224 indicates the media room 310 and an associated environmental parameter 223 indicates a volume level for an electronic device identifier 225 associated with the multimedia device 4C. The auxiliary network device 110F can detect or sense a volume level associated with the multimedia device 4C that is within proximity of the auxiliary network device 110F and can modify the volume level of the multimedia device 4C based on the setting 226 associated with the particular profile parameter 220. In one or more embodiments, the auxiliary network device 110F can send the sensed or detected environmental parameter to the principal network device 110A for analysis and principal network device 110A can respond with a command or an instruction (also referred to as an environmental instruction) for the auxiliary network device 110F to alter an aspect or operation of the multimedia device 4C, such as to increase or decrease the volume level of the multimedia device 4C. In one or more embodiments, the auxiliary network device 110F can detect that Users 350C, 350D, and 350E are talking and automatically modify the volume level of multimedia device 4C based on a location 224 associated with the profile parameter 220.

In one or more embodiments, a television 4D in the living room 308 can display content, for example, content received via the ISP 1. The principal network device 110A can detect a User 350B in the living room 308. User 350B can traverse the user environment 300 from living room 308 to the second bedroom 304. The auxiliary network device 110D can detect or sense the User 350B. The auxiliary network device 110D can broadcast the user location of User 350B and in response principal network device 110A can send a command or instruction for auxiliary network device 110D to change an aspect or operation of the television 4B, for example, to turn television 4B on, to tune television 4B to a particular channel, programming, or application, to alter any other aspect or operation of the television 4B. As an example, the auxiliary network device 110D can cause the television 4B to mirror television 4D such that User 350B can continue the same user experience from one room to another.

In one or more embodiments, the User 350B traverses to the second bedroom 304 to rest. A sensing device 120 can receive data associated with the User 350B. The sensing device 120 can be part of or coupled to the auxiliary network device 110D and can, for example, sense or provide data associated with a behavioral or emotional state of the User 350B based on a sound, biometric data, a user command, any other basis, or a combination thereof. A behavioral or emotional state can include a sleep or resting state, a sad state, a happy state, etc. For example, a voice user interface of the sensing device 120 can detect any of "snoring" indicative of a sleep state, "laughter" indicative of a happy state, "crying" indicative of a sad state, any other sound, or a combination thereof. Any one or more profile parameters 220 can be associated with any one or more behavioral or emotional states such that changing or altering an aspect or an operational status of any electronic device in the user environment 300 can be based on a profile parameter 220 associated with the data from a sensing device 120. For example, the data received by the sensing device 120 can be sent to the principal network device 110A and/or processed by the auxiliary network device 110D. Based on a profile parameter 220 associated with the User 350B, any client device 4, or a combination thereof, an instruction can be sent that changes or alters an operation of an electronic device indicated by an associated electronic device identifier 225, for example, a first television 4D and/or a second television 4B can be altered, such as a volume level can be decreased, a power can be set to off, a channel can be tuned to, any other operation, or a combination thereof.

In one or more embodiments, any one or more operations discussed with any network device 110 can be initiated by a user 350, for example, by a user 350 issuing a voice command to a voice user interface of a sensing device 120. For example, a User 350F at patio 314 could issue a voice command to auxiliary network device 110H to initiate a two-way communication with auxiliary device 110G at sunroom 316 such that User 350F can communicate via a first voice user interface of auxiliary network device 110H with User 350G via a second voice user interface of auxiliary network device 110G. The auxiliary network devices 110H and 110G can interconnect with each other directly or indirectly via principal network device 110A such that principal network device 110A can receive/send data to/from the auxiliary network devices 110H and 110G.

In another example, User 350A can ring a doorbell which causes auxiliary network device 110B to broadcast a notification to one or more other network devices 110 indicative of activity at or about the foyer 306 (such as a doorbell has been rung). A User 350F can be alerted to the activity by auxiliary network device 110H and issue a command or instruction to the auxiliary network device 110B to any of initiate a two-way communication with User 350A via a voice user interface of the auxiliary network device 110B, open or unlock a door at the foyer 306, turn on a light, initiate any other modification of an aspect or operation of one or more client devices at or about the foyer 306, or any combination thereof.

In one or more embodiments, any one or more users 350 of the user environment 300 can configure or set one or more profile parameters 220 via a user interface 29 of any of the one or more network devices 110. For example, User 350A could make a voice recording as a user identifier 222 that is associated with User 350A's unique identifier 221. The voice recording can be stored in a memory 210 of a network device 110 or at a network resource 6.

The present disclosure contemplates that any one or more network devices 110 can be an auxiliary network device, a principal network device or both. Additionally, the present disclosure contemplates that any functionality or operation discussed with respect to any one network device 110 can be performed by any one or more other network devices 110, a network resource 6, or any combination thereof.

Figure 4:
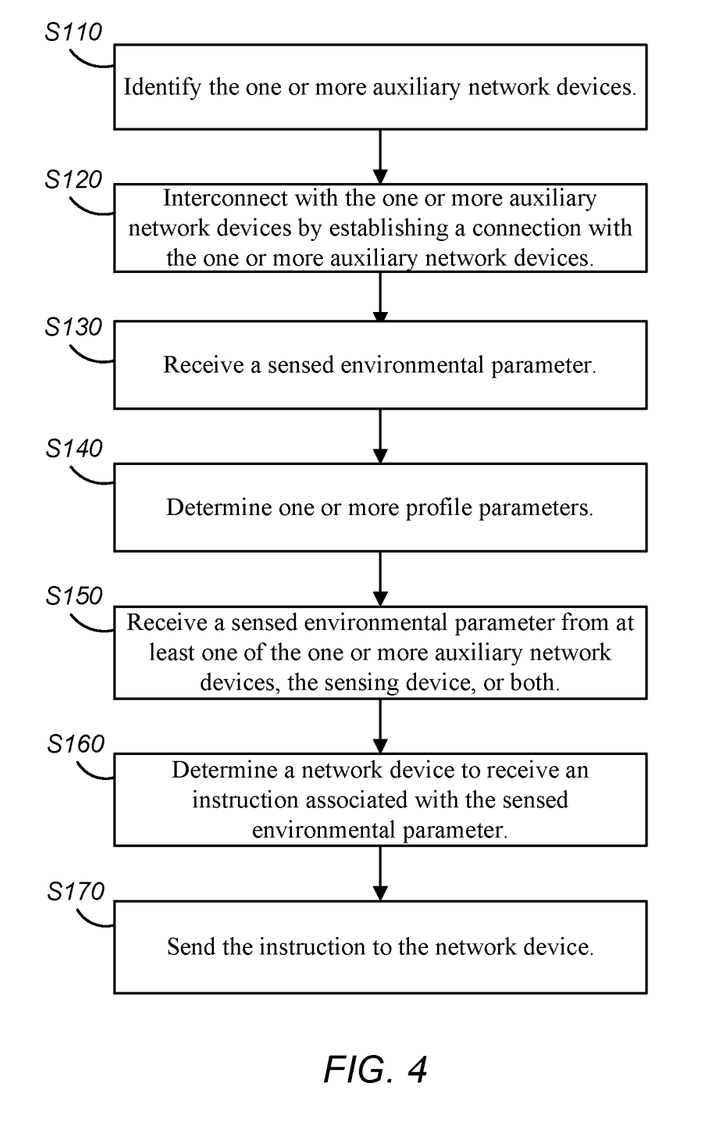
FIG. 4 is a flow chart illustrating a method for a principal network device to interconnect with one or more network devices, according to one or more aspects of the present disclosure.

FIG. 4 is a flow chart illustrating a method for a principal network device 110A to interconnect with one or more auxiliary network devices 110B-110H, according to one or more aspects of the present disclosure. The user environment 300 associated with one or more users 350 can be enhanced by providing interconnecting between network devices such that any one or more network devices can communicate a sensed environmental parameter to any one or more other network devices such that an aspect of the user environment 300 can be altered based on a profile parameter.

The principal network device 110A may be programmed with one or more computer-readable instructions such as a software or program 212 that when executed by a controller cause the principal network device 110A for interconnecting with one or more auxiliary network devices. In FIG. 4, it is assumed that any one or more of the devices include their respective controllers and their respective software stored in their respective memories, as discussed above in connection with FIGS. 1-3, which when executed by their respective controllers perform the functions and operations in accordance with the example embodiments of the present disclosure (e.g., including providing a calibration for a sound system). While the steps S110-S170 are presented in a certain order, the present disclosure contemplates that any one or more steps can be performed simultaneously, substantially simultaneously, repeatedly, in any order or not at all (omitted).

At step S110, the principal network device 110A identifies one or more auxiliary network devices (such as any of auxiliary network devices 110B-110H, collectively referred to as one or more network devices 110B-H). In a user environment 300, any number of network devices 110 can be installed or utilized. The principal network device 110A identifies the one or more auxiliary network devices 110B-H in the user environment 300 using any one or more protocols, for example, as discussed with reference to FIG. 1. Identifying the one or more auxiliary network devices 110B-H can include determining one or more features associated with the one or more auxiliary network devices 110B-H, such as any of a location, one or more capabilities or functions (such as associated one or more sensing devices), any other feature, or any combination thereof.

At step S120, the principal network device 110A can interconnect with the one or more auxiliary network devices 110B-H by establishing a connection with the one or more auxiliary network devices 110B-H, such as discussed with reference to FIG. 1. Interconnecting with the one or more auxiliary network devices 110B-H allows for one or more environmental parameters associated with any one or more users 350 to be sensed or detected. For example, a sensed environmental parameter associated with a user 350 at a first location can be communicated to any of the principal network device 110, any one or more auxiliary network devices 110B-H, or any combination thereof. In one or more embodiments, the interconnection interfaces a first voice user interface of the principal network device with a second user interface of an auxiliary network device.

At step S130, the principal network device 110A receives a sensed environmental parameter, for example, from at least one of the one or more auxiliary network devices 110B-H, a sensing device 120 of the principal network device 110A, or both. The sensed environmental parameter can comprise an audible input (such as a voice or other sound input), biometric data, any other sensed parameter, or a combination thereof. For example, a sensed environmental parameter can comprise a voice command from a user 350, a conversation between one or more users 350, a user sound associated with a behavioral or emotional state (such as laughter, snoring, sneezing, etc.), a sound from a client device (such as a ringtone, a beep, a tone, playback of content, etc.), any other sound input, or any combination thereof.

At step S140, the principal network device 110A determines one or more profile parameters 220. For example, the one or more profile parameters 220 can be associated with the sensed environmental parameter, a client device, any network device 110, a user 350, any other aspect or parameter of the user environment 300, or any combination thereof. In one or more embodiments, the one or more profile parameters 220 are determined based on a voice command of a user 350, a sound of an electronic device, a determined location of a user 350 or an electronic device, a user input received via a user interface 29, information received from a network resource 6, any other aspect of the user environment 350, or any combination thereof. In one or more embodiments, step S140 can occur prior to step S130.

At step S150, the principal network device 110A receives a sensed environmental parameter from at least one of the one or more auxiliary network devices 110B-H, a sensing device coupled to the processor of the principal network device 110A, or both. For example, any one or more auxiliary network devices 110B-H can communicate, propagate, or send one or more sensed environmental parameters sensed or detecting by a sensing device 120 coupled to or internal to the one or more auxiliary network devices 110B-H. In one or more embodiments, a user, a location, an electronic device (such as a client device 4 or a network device 110), any other parameter, or any combination thereof associated with the sensed environmental parameter is determined for use with, for example, step S160. For example, the sensed environmental parameter is associated with a client device 4 that is within proximity of at least one of the one or more auxiliary network devices 110B-H.

At step S160, the principal network device 110A determines a network device to receive an instruction associated with the sensed environmental parameter. For example, the principal network device 110A can compare the sensed environmental parameter to one or more parameters associated with a profile parameter 220. For example, the sensed environmental parameter can be compared to an environmental parameter 223 associated with a determined profile parameter 220. Based on any of a user identifier 222, a location 224, an electronic device identifier 225, a setting 226, any other parameter, or a combination thereof associated with the profile parameter 220, the principal network device 110 can determine the network device that should receive the instruction. The network device can be any electronic device, such as the principal network device 110A, at least one of the one or more auxiliary network devices 110B-H, a client device 4, any other electronic device, or a combination thereof. In one or more embodiments, the determining the network device is based on any of a user, a location, an electronic device, any other parameter, or any combination thereof associated with the sensed environmental parameter determined, for example, in step S160. In one or more embodiments, the instruction comprises an audible command for output at a second voice user interface of a network device, such as a principal network device 110, an auxiliary network device 110B-H, or any combination thereof.

The instruction can be any type of command or instruction, for example, that alters or modify an aspect or operation of any one or more electronic devices in a user environment 300. The instruction can be formatted by the principal network device 110A, any one or more auxiliary network devices 110B-H, a network resource 6, any other electronic device, or a combination thereof. The instruction can be based on a profile parameter 220. The instruction can be based on one or more settings 226 associated with the particular profile parameter 220, such as a setting 226 associated with the sensed environmental parameter. For example, a setting 226 can indicate a volume level for a client device 4 based on the determined profile parameter.

At step S170, the instruction is sent to an electronic device, such as any network device 110 in the user environment 300. In one or more embodiments, the instruction causes a network device 110 to alter or otherwise change an aspect or operation of any of the network device 110, any other network device 110, a client device 4, any other electronic device in the user environment 300, or a combination thereof. The instruction can comprise a notification to, for example, the user 350. The notification can comprise information associated with the client device. For example, the notification can include a tone, a beep, a visual message, a voice message, any other type of message or information, or any combination thereof.

According to some example embodiments of inventive concepts disclosed herein, there are provided novel solutions for providing an EAS message to a user independent of the operational status of external devices. The SMD ecosystem novel solution provides a significant improvement over traditional systems as the novel SMD ecosystem provides alerts to users without requiring any additional devices to present the EAS message. EAS messages are conveyed to users more efficiently and expeditiously. The novel SMD ecosystem also provides for multiple methods of delivering the EAS message such that multiple users can receive the EAS message in multiple languages ensuring that all users receive and understand the EAS message. Further the novel SMD ecosystem provides a two-way communication so that the user can provide real-time feedback regarding the EAS message. Such a two-way communication can improve the health and safety of a user by providing information to emergency response personnel.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A principal network device for interconnecting with one or more auxiliary network devices comprising:
   a sensing device coupled to a processor;
   a memory storing one or more computer-readable instructions; and
   the processor configured to execute the one or more computer-readable instructions to:
   identify the one or more auxiliary network devices;
   interconnect with the one or more auxiliary network devices by establishing a connection with the one or more auxiliary network devices;
   receive a sensed environmental parameter from at least one of the one or more auxiliary network devices, the sensing device, or both, wherein the sensed environmental parameter comprises an audible input;
   determine a network device to receive an instruction associated with the sensed environmental parameter based on a profile parameter, wherein the network device is any of the principal network device, the at least one of the one or more auxiliary network devices, or a combination thereof; and
   send the instruction to the network device, wherein the instruction comprises an audible command for output at a user interface of the network device.

2. The principal network device of claim 1, wherein the processor is further configured to execute the one or more instructions to:
   determine a user associated with the sensed environmental parameter;
   determine a location of the user; and
   wherein determining the network device is based on the location of the user.

3. The principal network device of claim 2, wherein the sensed environmental parameter is associated with a client device within proximity of the at least one of the one or more auxiliary network devices.

4. The principal network device of claim 3, wherein the instruction comprises a notification to the user, and wherein the notification comprises information associated with the client device.

5. The principal network device of claim 1, wherein the instruction comprises a command for the network device to establish a two-way communication with a first auxiliary network device of the one or more auxiliary network devices.

6. The principal network device of claim 1, wherein the processor is further configured to execute the one or more instructions to:
determine a setting associated with the profile parameter.

7. The principal network device of claim 6, wherein the instruction comprises a command to alter an operation of one or more client devices within proximity of the network device based on the setting.

8. A method for a principal network device to interconnect with one or more auxiliary network devices, the method comprising:
identifying the one or more auxiliary network devices;
interconnecting with the one or more auxiliary network devices by establishing a connection with the one or more auxiliary network devices;
receiving a sensed environmental parameter from at least one of the one or more auxiliary network devices, a sensing device coupled to a processor of the principal network device, or both, wherein the sensed environmental parameter comprises an audible input;
determining a network device to receive an instruction associated with the sensed environmental parameter based on a profile parameter, wherein the network device is any of the principal network device, at least one of the one or more auxiliary network devices, or a combination thereof; and
sending the instruction to the network device, wherein the instruction comprises an audible command for output at a voice user interface of the network device.

9. The method of claim 8, further comprising:
determining a user associated with the sensed environmental parameter;
determining a location of the user; and
wherein determining the network device is based on the location of the user.

10. The method of claim 9, wherein the sensed environmental parameter is associated with a client device within proximity of the at least one of the one or more auxiliary network devices.

11. The method of claim 10, wherein the instruction comprises a notification to the user, and wherein the notification comprises information associated with the client device.

12. The method of claim 8, wherein the instruction comprises a command for the network device to establish a two-way communication with a first auxiliary network device of the one or more auxiliary network devices.

13. The method of claim 8, further comprising:
determining a setting associated with the sensed environmental parameter.

14. The method of claim 13, wherein the instruction comprises a command to alter an operation of one or more client devices within proximity of the network device based on the setting.

15. A non-transitory computer-readable medium of a principal network device storing one or more instructions for interconnecting with one or more auxiliary network devices, which when executed by a processor of the principal network device, cause the principal network device to perform one or more operations comprising:
identifying the one or more auxiliary network devices;
interconnecting with the one or more auxiliary network devices by establishing a connection with the one or more auxiliary network devices;
receiving a sensed environmental parameter from at least one of the one or more auxiliary network devices, a sensing device coupled to a processor of the principal network device, or both,
wherein the sensed environmental parameter comprises an audible input;
determining a network device to receive an environmental instruction associated with the sensed environmental parameter based on a profile parameter, wherein the network device is any of the principal network device, at least one of the one or more auxiliary network devices, or a combination thereof; and
sending the environmental instruction to the network device, wherein the instruction comprises an audible command for output at a user interface of the network device.

16. The computer-readable medium of claim 15, wherein the one or more instructions when further executed by the processor cause the principal network device to perform one or more further operations comprising:
determining a user associated with the sensed environmental parameter;
determining a location of the user; and
wherein determining the network device is based on the location of the user.

17. The computer-readable medium of claim 16, wherein the sensed environmental parameter is associated with a client device within proximity of the at least one of the one or more auxiliary network devices.

18. The computer-readable medium of claim 17, wherein the environmental instruction comprises a notification to the user, and wherein the notification comprises information associated with the client device.

19. The computer-readable medium of claim of claim 15, wherein the environmental instruction comprises a command for the network device to establish a two-way communication with a first auxiliary network device of the one or more auxiliary network devices.

20. The computer-readable medium of claim 15, wherein the one or more instructions when further executed by the processor cause the principal network device to perform one or more further operations comprising:
determining a setting associated with the profile parameter; and
wherein the environmental instruction comprises a command to alter an operation of one or more client devices within proximity of the network device based on the setting.

* * * * *